(No Model.) 2 Sheets—Sheet 1.
G. CASE.
SPOOL FOR BARBED WIRE.
No. 312,188. Patented Feb. 10, 1885.
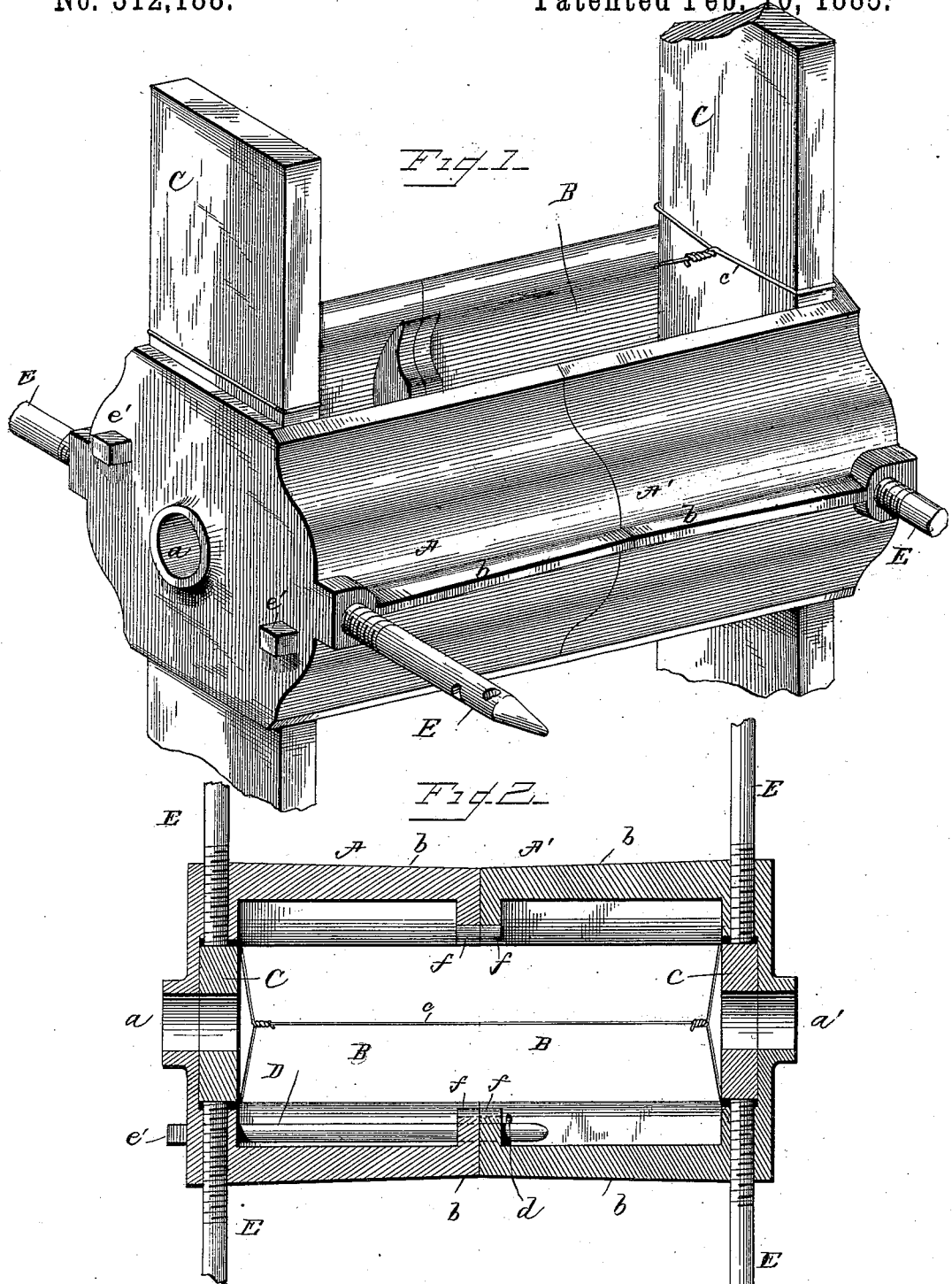
WITNESSES
F. L. Ourand
W. A. Gamer
INVENTOR
George Case
by L. Deane
his Attorney

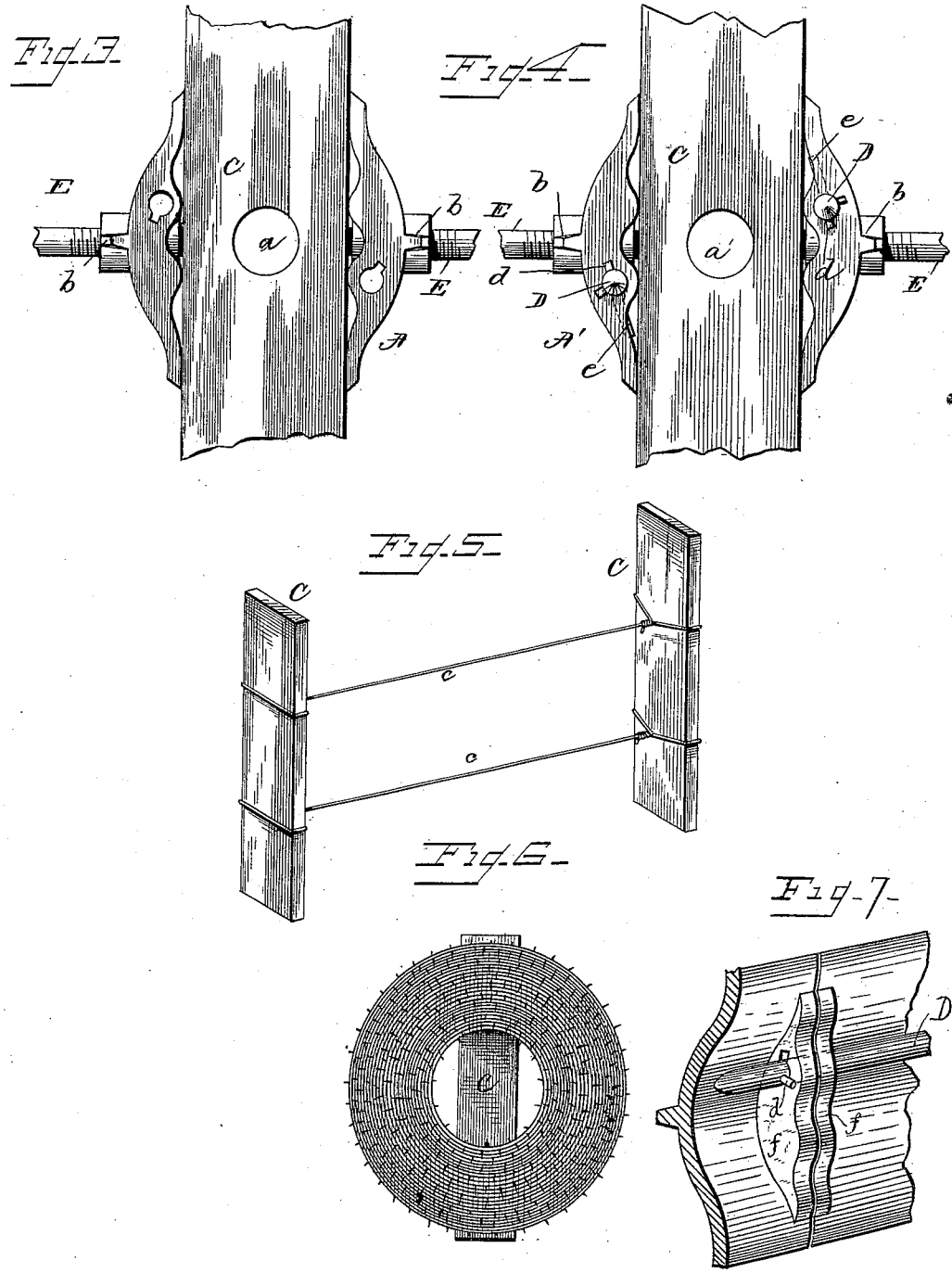

UNITED STATES PATENT OFFICE.

GEORGE CASE, OF JOLIET, ILLINOIS, ASSIGNOR TO WILLIAM T. CONKLIN, OF SAME PLACE.

SPOOL FOR BARBED WIRE.

SPECIFICATION forming part of Letters Patent No. 312,188, dated February 10, 1885.

Application filed September 25, 1884. (No model.)

*To all whom it may concern:*

Be it known that I, GEORGE CASE, a citizen of the United States, residing at Joliet, in the county of Will and State of Illinois, have invented certain new and useful Improvements in Spools for Barbed Wire, of which the following is a specification, reference being had therein to the accompanying drawings.

Figure 1 is a perspective view of my improved spool or reel complete. Fig. 2 is a longitudinal section taken centrally through the spool. Figs. 3 and 4 are views of the inner ends of the two sections composing the core or body of the spool. Fig. 5 is a view of the clamping-boards connected by wire ties. Fig. 6 is a vertical section of a bale or package detached from the two sections composing the body or core of the spool and ready for the market. Fig. 7 is a sectional detail showing the locking device $d$ of the rod D.

This invention relates to means for baling or winding and packing wires which are used for check-rowing, for barbed fences, and for other purposes where it is desired to transport and keep on sale bales of wire in compact and convenient packages.

The nature of my invention consists in a novel construction of a spool or reel, whereby it is adapted to receive and hold the clamping-boards and tie-wires, and after the bale is completed to be readily removed therefrom, leaving the said clamping-boards on the bale, as will be fully understood from the following description, when taken in connection with the annexed drawings, in which—

A A designate two hexagonal sections, which are preferably made of cast-iron, and which are constructed hollow, with their open ends adapted to fit snugly together, as shown in Figs. 1 and 2. These sections A A' are provided with holes $a$ $a$ centrally through their outer ends, for the purpose of receiving a shaft of a wire-winding machine, which machine will be adapted for applying the knots on check-row wire, or applying barbs on fence-wire. The circumferences of the said sections are constructed with longitudinal ribs $b$ $b$ for the purpose of affording very little bearing-surface for the bale-wire next to the sections, and thereby allowing these sections to be readily drawn from the eye of a finished bale.

B B are oblong openings through the sections constituting the core of the spool, which openings are diametrically opposite each other, and are adapted to receive through them the clamping-boards C C, which are connected together by means of strong wire ties $c$ $c$. The core-sections A A' are connected together by means of key-bolts D D, provided near their inner pointed ends with locking-studs $d$ $d$ and stop-pins $e$ $e$, and on their outer ends, $e'$ $e'$, with square ends to receive a turn-key for locking and unlocking the sections. The said locking key-bolts D D are applied in bearings formed in the core-section A, and the pointed ends of these bolts enter webs $f$ $f$, formed on the inner end of the section, through which webs are holes having offset notches, to allow the studs $d$ $d$ to pass freely. By then giving a slight turn to the bolts the studs will engage with the webs $f$ $f$ and securely lock the core-sections together. When a bale of wire is wound on the core-sections, they can be detached from each other and slipped from the eye of the bale, leaving the boards C C and their tie-wires firmly clamping the sides of the bale, and preventing its wire from unwinding.

E E E E designate four radial reel-arms, which are screwed into the core-sections A A' near their ends, and constructed with pointed outer ends having holes through them to receive a lever for adjusting the arms. The inner ends of the reel-arms E serve to confine the clamping-boards in their places in the core-sections A A' and to release these boards therefrom when it is desired to remove these sections from a bale, package, or coil of wire.

The reel is composed of two parts, each one of which is tapered to the middle of the length of the reel; therefore the sections are readily removable from the finally-wound coil.

It will be observed that the clamping-boards serve as reel-arms when they are confined to the core-sections A A'.

Having described my invention, what I claim as new is—

1. A wire spool or reel composed of separable hollow core-sections A A′, provided with longitudinal ribs on their surfaces, in combination with locking devices and reel-arms, substantially as described.

2. The combination, with the core-sections and the reel-arms and locking devices, of the clamping-boards connected by wire ties, and confined by the reel-arms E, substantially as described.

3. The combination, with the separable core-sections and their locking devices, of endwise-adjustable clamping reel-arms, substantially as described.

4. The combination, in a reel, of separable hollow ribbed and webbed sections tapered from their outer ends to their inner ends, and provided with a locking device, with the screw-threaded clamping-arms, the wire-coil clamping-arms, and their connecting-wires, all constructed and adapted to operate substantially in the manner and for the purposes described.

5. In a reel, two longitudinal separable sections tapered from the ends to the center, substantially as described.

6. In a wire-reel, two longitudinal ribbed sections having locking devices for connecting the sections endwise, substantially as described.

7. In a wire-reel, two hollow sections having longitudinal ribs and axial perforations, substantially as described.

In testimony whereof I affix my signature in presence of two witnesses.

GEORGE CASE.

Witnesses:
CHARLES F. BLOOD,
CHARLES W. STAEHLE.